July 18, 1939.　　　G. H. PARKER　　　2,166,822

SPRING SUSPENSION AND MOUNTING

Filed Feb. 28, 1938

GLENN H. PARKER. *INVENTOR*

Haines, Lind, Patee & Harris

ATTORNEYS.

Patented July 18, 1939

2,166,822

UNITED STATES PATENT OFFICE 2,166,822

SPRING SUSPENSION AND MOUNTING

Glenn H. Parker, Royal Oak, Mich., assignor to Chrysler Corporation, Highland Park, Mich., a corporation of Delaware Application February 28, 1938, Serial No. 192,973

13 Claims. (Cl. 267—54)

This invention relates to improved mounting members.

More particularly, the invention pertains to improvements in mounting members such as shackles and brackets of the character employed in the mounting of springs of vehicles and the like.

One of the main objects of the invention is the provision in shackles and mounting brackets of this character of yieldably connected relatively movable parts which are separated and securely connected together by sound insulating material.

Another object of the invention is the provision between the relatively movable parts of spring shackles and mounting brackets of this kind of rubber connecting elements which are integrally bonded to such parts and so constructed and arranged therebetween as to both sustain the normal load thereon and accommodate relative movement of the parts with respect to each other by sheer stress of the rubber.

A further object of the invention is the provision of comparatively thin layers of rubber between such relatively movable shackle and mounting bracket parts which accommodate yielding of the parts in the direction of spring action mainly while opposing relative movement of the shackle and mounting bracket parts laterally of the direction of spring action by subjecting the rubber mainly to compressive and tensional stress.

Still further objects of the invention are to provide in vehicle spring shackles and spring mounting brackets having relatively movable parts so resiliently bonded together as to stably hold the sprung and unsprung portions of a vehicle against unintended relative lateral movements while accommodating relative vertical movements of a rate suitable to dampen sound vibrations of the order which result from driving of a vehicle over slight road irregularities, and to provide resiliently bonded together spring shackle and spring mounting bracket parts which prevent the transmission of such sound vibration from the unsprung to the sprung portions of a vehicle without interfering with the normal rate and action of the vehicle springs.

An additional object of the invention is the provision of improved mounting members which may be used in diverse applications where resiliently yielding movement of the mounted structure or a portion thereof is desired.

Other objects and advantages of the invention will be more apparent from the following description taken in connection with the accompanying drawing.

Figure 1:
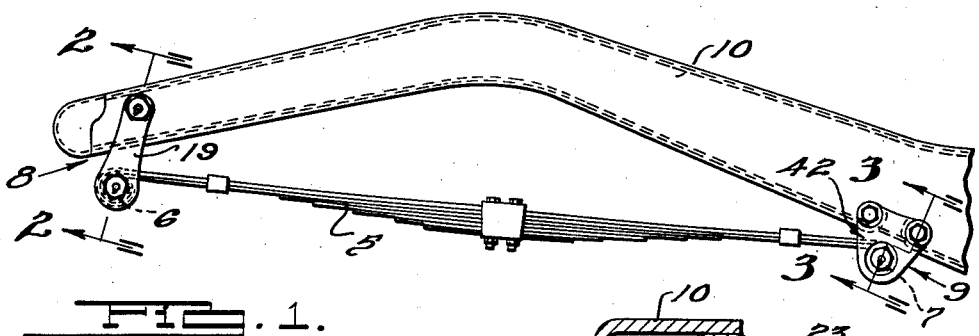
Fig. 1 is a fragmentary, side elevational view of a vehicle suspension embodying the invention.

In the form of the invention illustrated in the drawing, a vehicle front leaf spring 5 has its front and rear eyes pivotally connected at 6 and 7 respectively to the lower end portion of a front shackle 8 and a rear mounting member 9 which are carried by a vehicle frame side rail 10.

It will be understood that the improved shackle 8 and the improved mounting member 9 may be used at other points in the vehicle suspension without departing from the scope of the invention.

The front spring shackle 8 comprises an internally threaded sleeve 11 suitably fixed to the side rail 10 and extending transversely thereof. A threaded pin 12 extends through and is threaded in the sleeve 11. The pin 12 has formed thereon threaded reduced end portions 13, and has a lubricant passage 14 and a lubricant fitting 15 communicating with the inner surface of the sleeve 11. Non-rotatably secured within the front eye of the spring 5 is an internally threaded sleeve 16 which is parallel to the sleeve 11, and in which is threaded a pin 26 having outwardly extending threaded end portions.

The pins 12 and 26 are pivotally connected together by a pair of links, generally indicated by the numerals 17 and 18. Each of the links comprises a pair of plate-like elements 19 and 20 fixed together at 23, preferably by welding, and having spaced intermediate and lower portions which diverge laterally at 21 to form a chamber 22 therebetween. The links 17 and 18 are disposed in planes extending longitudinally of the vehicle and they are secured to the reduced end portions of the pin 12 by fasteners 24. Each of the links 17 and 18 further comprise a flat, floating, plate-like member 25 which is disposed in the chamber 22. The members 25 are provided with apertures 25' which register with openings 20' in the plates 19 and 20 and are secured to the spring 5 by the threaded bolt 26 which extends through the sleeve 16 and which is threaded in the openings 20'. Each member 25 includes a flat portion 27 having surfaces 28 and 29 which are disposed in planes substantially parallel to the plates 19 and 20. Disposed in the spaces between the surfaces 28 and 29 and the adjacent surfaces of the members 17 and 18 are relatively thin layers of rubber 30 and 31. These rubber layers are suitably bonded, preferably by vulcanization or adhesion, to the adjacent surfaces of the flat plate-like portions 27 and the members 19 and 20 of each link. When the rubber is vulcanized between the spaced surfaces of the metal structure, it shrinks sufficiently to subject it to an initial tension therebetween. The rubber, however, is stressed in sheer under the weight of the unsprung portion of the vehicle regardless of the manner in which it is bonded to the metal surfaces between which it is disposed.

Figure 3:
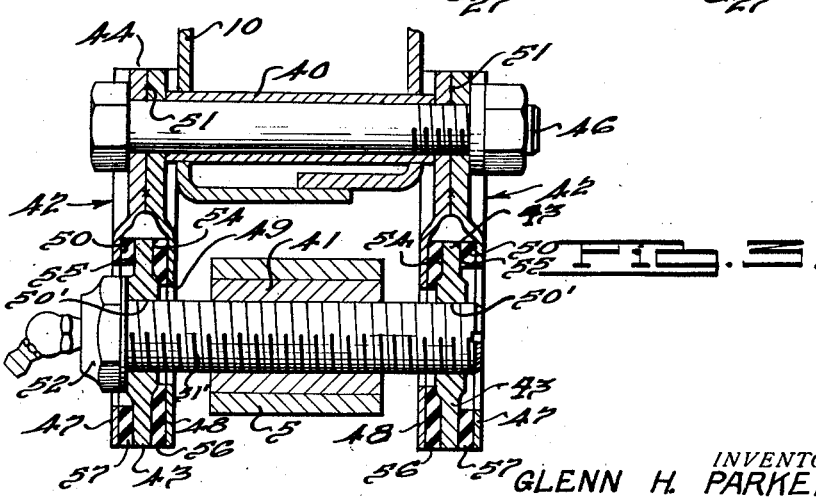
Fig. 3 is a fragmentary, transverse sectional view taken as indicated by the line 3—3 of Fig. 1 and showing a front spring rear mounting member embodying the invention.

The front spring rear mounting member 9 (best shown in Fig. 3) is of substantially the same general construction as the shackle 8. This mounting bracket includes a pair of side members, generally designated by the numeral 42, each comprising plate-like elements 47 and 48 having upper end portions welded together at 51, and laterally offset intermediate and lower end portions forming a chamber 50 therebetween. The upper ends of the plate-like elements 47 and 48 are provided with apertures through which extend spaced securing bolts 46 carried by a sleeve 40 mounted on the frame 10. Each side member 42 has a floating disc-shaped metal element 43 disposed in its chamber 50 and secured in spaced relation to the plate-like elements 47 and 48 by a body of yieldable material 56 and 57, preferably comprising rubber. The disc-shaped metal elements 43 have substantially flat surfaces 54 and 55 bonded, preferably by vulcanization or adhesion, to the rubber body 56 and 57 which is bonded in a similar manner to the internal side walls of the chamber 50.

The lower end portions of the plates 47 and 48 are provided with apertures 49 which register with apertures 50' in the discs 43 in which a pin 51' is threaded, the pin 51' being locked against turning relative to one disc 43 by a nut 52. The pin 51' is also threaded in a sleeve 41 which is non-rotatably fixed within an eye formed at the rear end of the spring 5.

Figure 2:
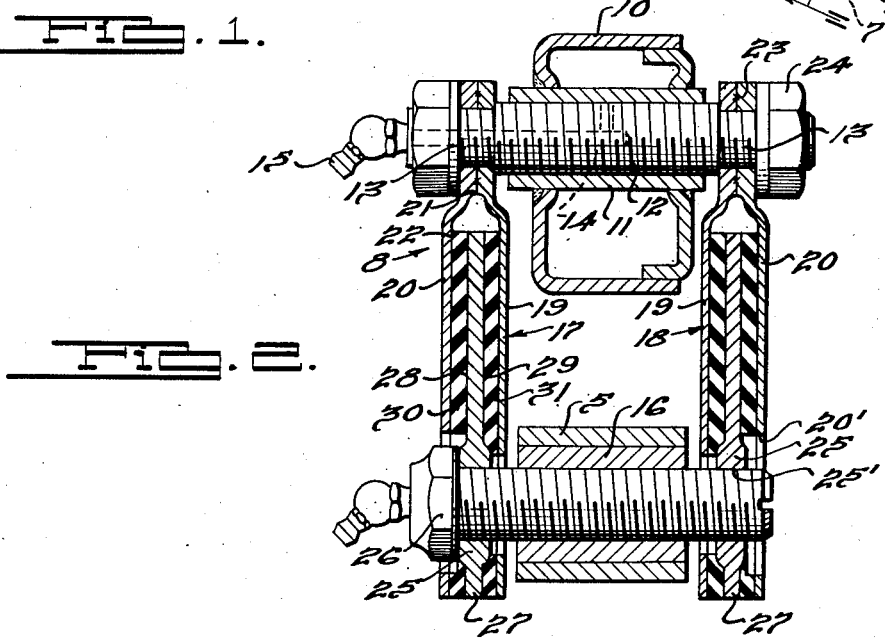
Fig. 2 is a transverse, sectional view taken along the line 2—2 of Fig. 1.

The rubber elements of both the links of the shackles and the side members of the rear spring support may be placed under an initial tension as a result of the contraction of the rubber after the vulcanization thereof during the bonding operation. These rubber elements, as well as those of the shackle shown in Fig. 2, may be placed under lateral compression or left in a normal state by suitably compressing the opposite plate-like members between which they are disposed. Under any of these conditions the rubber members are stressed in sheer under the weight of the unsprung portion of the vehicle and they accommodate slight relative movement of the respective parts of the spring mounting members in shear. The thickness of the rubber between the flat faces of the relatively movable parts of the mountings is so limited as to hold such parts and the structures they connect from excessive lateral movement. The metal parts of the mountings which are connected to the sprung and unsprung portions of the vehicle are effectively sound insulated from each other.

The provision of integrally, yieldably bonded together, relatively movable parts in a structure of this character prevents wear of metallically engaged parts. The resiliently yielding action between the parts of the mounting assists in the absorbing of slight shock and vibration and more particularly prevents the transmission of road noise from the wheels and springs to the body portion of the vehicle. All this is accomplished without disturbing the rate of spring action for which the springs are designed for the stressing of relatively small amounts of rubber in shear does not result in sufficient amplitudes of movement within the range of frequency of the springs to interfere therewith. The provision of relatively large surface areas at the locations of the bonds between the rubber and metal parts, and the construction and arrangement of the rubber layers as well as the nature of the stresses to which they are subjected, enables the use of rubber or other resilient material of suitable rate to absorb, dampen or otherwise prevent the transmission of sound vibrations of the order created during driving of a vehicle over road irregularities from the unsprung to the sprung portion of the vehicle.

Various modifications and changes will be apparent from the teachings of the invention as set forth in the appended claims, and it is not my intention to limit the invention to the particular details of construction and operation shown and described for illustrative purposes.

What I claim is:

1. A spring shackle comprising a pair of pivot members, a pair of links each comprising a section mounted on one of said members and having spaced plate-like side walls and a relatively movable section mounted on said other member and having a plate-like portion extending between said plate-like walls of said first-mentioned sections in spaced relation thereto, and relatively thin layers of yieldable material between and bonded to the adjacent surfaces of said plate-like portion and walls, respectively.

2. A spring shackle comprising a pair of pivot members, a pair of links each comprising a section mounted on one of said members and having spaced plate-like side walls and a relatively movable section mounted on said other member and having a plate-like portion extending between said walls in spaced relation thereto, and relatively thin layers of rubber between and bonded to the adjacent surfaces of said plate-like portion and walls and so constructed and arranged as to accommodate relative axial movement of said sections by shear stress of said rubber and to oppose relative lateral movement thereof mainly by compressive stress of said rubber.

3. A spring shackle comprising a pair of pivot members, a pair of links each comprising a section mounted on one of said members and having spaced plate-like side walls and a relatively movable section mounted on said other member and having a plate-like portion extending between said walls in spaced relation thereto, and relatively thin layers of rubber between and bonded to the adjacent surfaces of said plate-like portion and walls and so constructed and arranged as to accommodate relative axial movement of said sections by shear stress of said rubber and to oppose relative lateral movement thereof mainly by compressive stress of said rubber, said rubber layers being normally under tension between said surfaces.

4. A device for mounting a leaf spring on a vehicle chassis comprising a pair of suspension plate members each including a section securable to said chassis and having spaced plate-like walls disposed substantially in planes parallel to the length of said spring and a relatively movable section securable to said spring and having a plate-like portion extending between said walls and in spaced relation thereto, and relatively thin layers of rubber interposed between and bonded to the adjacent surfaces of said plate-like walls and portions of said sections and constituting the sole direct connecting attachment therebetween.

5. In a vehicle comprising sprung and unsprung portions; a spring suspension therebetween including a leaf spring, and a yieldable mounting means for connecting said spring to one of said vehicle portions, said means including a pair of metal parts, one secured to said vehicle portion and the other to said spring and having substantially plane opposed surface portions disposed in substantially vertical planes, and a yieldable non-metallic connecting layer between said plane surface portions having sound insulating properties, said yieldable layer being bonded to said surface portions and so constructed and arranged between said parts as to sustain the vehicle weight applied thereon in shear, and to oppose lateral movement of said parts and the portions of the vehicle attached thereto by compressive stress of said layer.

6. In a vehicle comprising sprung and unsprung portions; a spring suspension therebetween including a leaf spring, and a mounting member yieldably connecting each end of said spring to one of said vehicle portions, each of said mounting members comprising plate-like elements secured to said spring and vehicle portion respectively and disposed in planes substantially parallel to the plane in which deflection of said spring occurs and having a relatively thin layer of rubber therebetween and bonded to the surfaces of said plate-like elements, said layers of rubber being so constructed and arranged as to sustain the part of the weight of said vehicle applied thereon in shear and to accommodate relative vertical movement of said spring and said vehicle portion by shear stress of said rubber.

7. In a vehicle including sprung and unsprung portions and having a spring suspension therebetween including a leaf spring; a shackle swingably connecting an end of said spring to said sprung portion including a pair of links each comprising a pair of plate-like telescoping inner and outer sections, and relatively thin layers of rubber having sides bonded to adjacent sections of said links for yieldably connecting said sections together, said plate-like sections being disposed in substantially vertical planes parallel to the length of said spring and said rubber layers being stressed in shear under vehicle weight and so calibrated in rate as to absorb noise producing vibration of the order which is created by driving of a vehicle over slight road irregularities.

8. A spring shackle comprising a pair of pivot members, a pair of links connecting opposite end portions of said pivot members, each link including a metal section securable to one pivot member and a relatively movable metal section securable to the other pivot member, and a yieldable connecting member comprising non-metallic material having sound insulating properties joining said sections.

9. A spring shackle comprising a pair of pivot members, means for connecting said pivot members including a link having a metal section securable to one of said pivot members and a relatively movable metal section securable to the other pivot member, and a layer of rubber between and bonded to adjacent surfaces of said sections and constituting the sole direct connection therebetween.

10. A spring shackle comprising a pair of links, each including telescoping inner and outer metal sections having opposed substantially plane surfaces disposed substantially longitudinally of said links, and rubber between said surfaces of said sections and bonded thereto.

11. A spring shackle comprising a pair of links, each including a plate member having a bifurcated end portion having flat wall portions, a plate member extending between said wall portions, and a layer of rubber between and bonded to adjacent surfaces of said plate members for accommodating relative yielding movement of said plate members under shear stress.

12. In a vehicle comprising sprung and unsprung portions having a spring suspension therebetween including a leaf spring, a mounting member yieldably connecting a part of said leaf spring to one of said vehicle portions comprising a pair of metal sections one attached to said leaf spring and the other attached to one of said vehicle portions, said metal sections having plate-like portions disposed in planes substantially parallel to the plane in which normal deflection of said spring occurs, a relatively thin layer of rubber between said plate-like portions having opposite sides bonded to said plate-like portions respectively, said layer of rubber being so constructed and arranged as to sustain the part of the weight of said vehicle applied thereon in shear and to accommodate relative vertical movement of said spring and one of said vehicle portions by shear stress of said rubber.

13. A spring shackle comprising a pair of pivot members, a pair of links each comprising a section mounted on one of said members and a relatively movable section mounted on the other member, the sections of each link having adjacent plate-like wall portions and being relatively movable, and a relatively thin layer of rubber between and bonded to said adjacent plate-like wall portions of the sections of each link respectively and so constructed and arranged as to accommodate axial movement of said sections by shear stress of said rubber and to oppose relative lateral movement thereof mainly by compression stress of said rubber.

GLENN H. PARKER.